Sept. 9, 1924.  J. P. STODDART  1,508,304
BOILER
Filed Oct. 9, 1922    2 Sheets-Sheet 1

J. P. Stoddart
INVENTOR

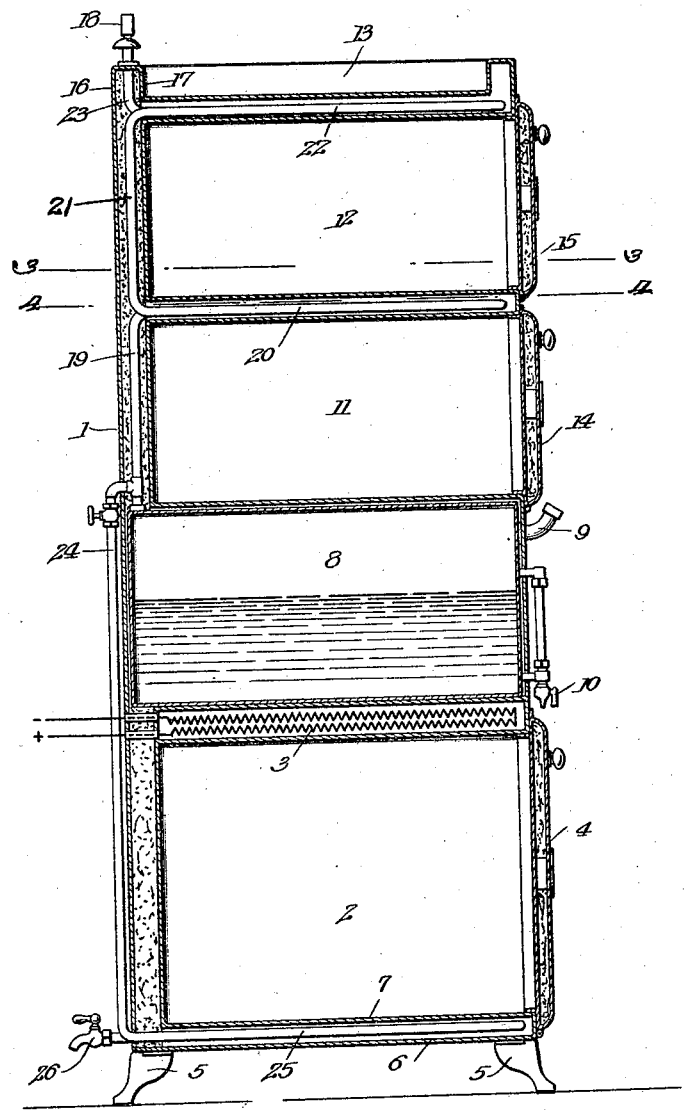

Patented Sept. 9, 1924.

1,508,304

UNITED STATES PATENT OFFICE.

JOHN PENDREIGH STODDART, OF ARICA, CHILE.

BOILER.

Application filed October 9, 1922. Serial No. 593,380.

*To all whom it may concern:*

Be it known that I, JOHN PENDREIGH STODDART, a subject of the King of Great Britain, residing at Salinas Chacalluta, Arica, Chile, South America, have invented new and useful Improvements in Boilers, of which the following is a specification.

My present invention has reference to a cooking apparatus and is in the nature of a combined boiler and steamer.

The primary object of the invention is to produce a cooking apparatus in which a heater is employed for heating water in a chamber above the heater and wherein the steam generated by the heated water will pass through coils in cooking compartments arranged in superimposed relation above the water chamber, steam being likewise delivered to an oven compartment which is arranged below the heater, suitable means being provided for indicating the degrees of heat in the oven and in the various compartments, while the uppermost compartment is provided with a steam blow-off, and the device is further provided for draining condensation from the steam as well as drawing off the heated water and supplying the tank therefor.

To the attainment of the foregoing and other objects which will present themselves as the nature of the invention is better understood, reference is to be had to the drawings which accompany and form part of this application.

In the drawings:—

Figure 2 is a sectional view on the line 2—2 of Figure 1.

Figure 1:
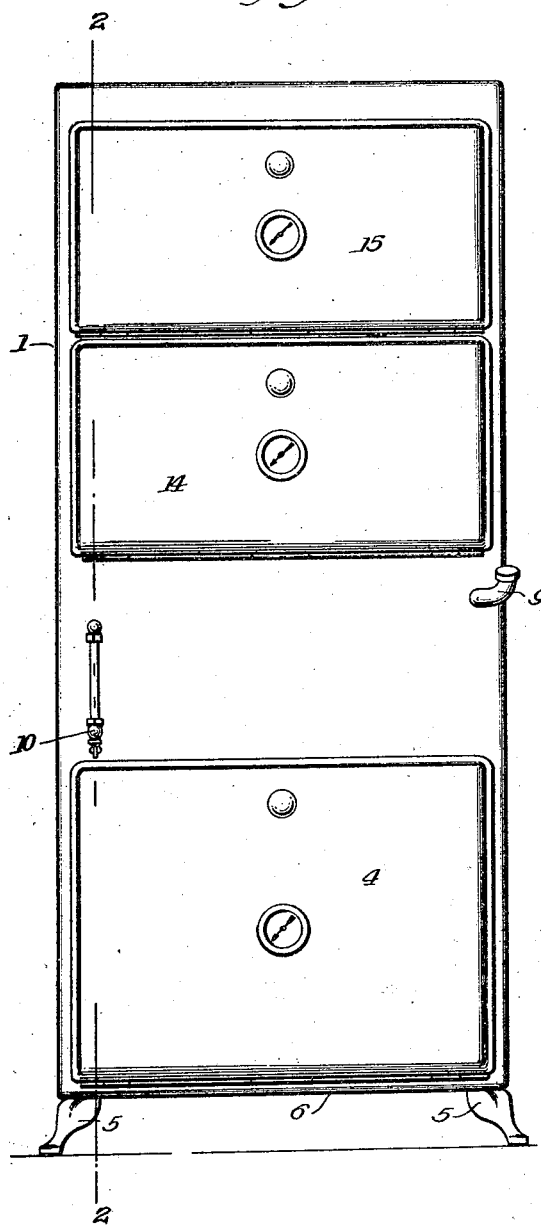
Figure 1 is a general view of the improvement.
Figure 3:
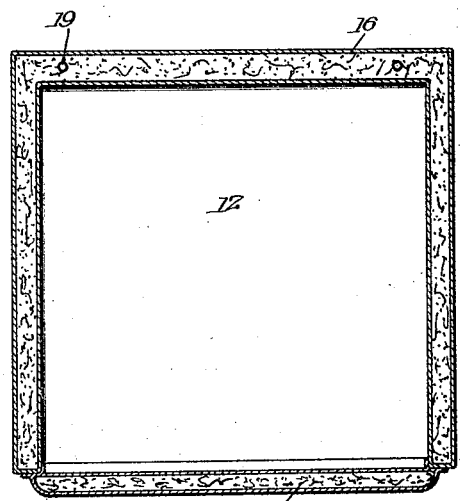
Figure 3 is a sectional view on the line 3—3 of Figure 2.

My improvement is broadly indicated by the numeral 1. As disclosed by the drawings, all of the walls, except the front of the device are double and all of the walls have a coating or facing of heat retaining substance. The casing of the improvement comprises a lower oven compartment 2 in the top of which there is supported the heater 3. In the showing of the drawings, the heater is in the nature of an electric coil, but it is obvious that other heating means may be employed, such for instance as an oil or other vapor heater. The front of the oven compartment is open, but is closed by a hinged door 4, suitable latching means being provided between the door and the casing, and the door 4, as well as the other doors hereinafter referred to is provided with a thermometer, whereby the temperature in the oven may be ascertained from the exterior thereof. The casing of the improvement is supported upon legs 5, the lower wall of the casing being indicated by the numeral 6, and the lower wall of the oven by the numeral 7. These walls are spaced away from each other, as are also the rear and side walls between the oven and casing.

The casing, directly above the oven 2, and also directly above the heater 3 is divided by a horizontal partition from the heater to provide a water chamber 8. This chamber, at the front of the casing and at the top of the said compartment has a filler spout 9 and at the bottom of the compartment there is a cock 10 whereby heated water in the compartment or chamber may be drawn therefrom when desired. To avoid scale deposit in the compartment and in the pipes communicating therewith, a suitable preventive compound is preferably fed through the spout 9 into the water compartment or chamber 8.

Above the water chamber 8 there is a heating compartment 11, and above the compartment 11 there is a similar compartment 12, while above the compartment 12 there is the tray-like top 13 of the casing. The top and bottom walls of the compartments and of the tray-like top 13 are spaced away from each other which is also true with respect to the rear walls of the said compartments and the rear wall of the casing. This may be also true with respect to the side walls between the casing and compartments, but the front of the casing is open so that access may be had to the several compartments. These openings, however, are closed by hinged doors 14 and 15 respectively, suitable latching means being provided between the doors and the casing. Preferably all of the doors, 4, 14 and 15 have their edges and ends flanged or stepped to engage with similarly shaped ends and edges of the oven and compartments so that the heat will be effectively retained in the oven and in the compartments.

Between the rear wall 16 of the casing and the rear wall 17 of the top 13 there is an exhaust valve 18 whereby the excess steam generated by the water in the chamber 8 will find an outlet.

Figure 4:
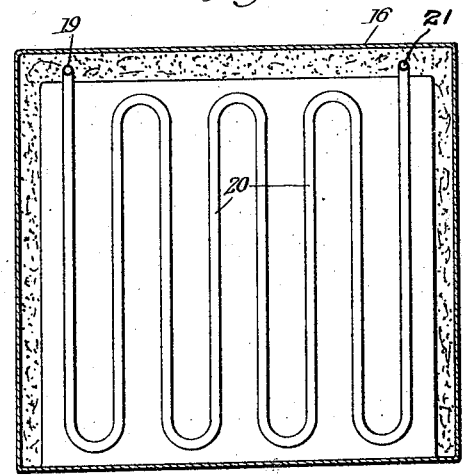
Figure 4 is a sectional view on the line 4—4 of Figure 2.

Leading from the chamber 8 between the spaced rear wall of the compartment 11 and the walls 16 of the casing there is a steam conducting pipe 19. This pipe is coiled, as at 20 between the upper wall of the compartment 11 and the bottom wall of the compartment 12. The second end pipe of the coil 20, indicated by the numeral 21 (Figures 2 and 4) is directed through the space between the rear wall of the compartment 12 and the wall 16 and is connected with a coil 22 that is arranged between the bottom wall of the flanged or tray-like top 13 and the top wall of the compartment 12, the end upper member of the coil being directed through the passage between the walls 16 and 17. This pipe extension, indicated by the numeral 23 is arranged directly beneath the safety or blow-off valve 18 and of course, provides the outlet for the coils. An excess of steam, as previously stated, will find an outlet through the valve 18. Also communicating with the water chamber 8 adjacent to the top thereof there is a pipe 24 which is directed downwardly between the rear walls of the chamber 8, the oven 2 and the wall 16 of the casing and communicates with coils 25 arranged horizontally between the walls 6 and 7. The outlet for the lower coil 25 is directed through the wall 16 of the casing and has secured thereon a cock 26 through which steam may be drawn and also through which the condensation of the steam is drawn.

It is, of course, to be understood that suitable control means is provided for the heater, and it will be apparent to those skilled in the art to which this invention relates that a great quantity of foodstuff may be boiled or baked in an effective manner and at a small expenditure of heat with the improvement.

While I have herein set forth a satisfactory embodiment of my device, I desire it to be understood that I do not wish to be restricted to the precise structural details herein set forth, but am entitled to all such changes therefrom as fall within the scope of what is claimed.

Having described the invention, I claim:—

1. In a cooking apparatus, a casing having superimposed compartments therein, the lowermost compartment providing an oven, the next compartment providing a water tank, and the remaining compartments providing cooking compartments, means admitting water into the water compartment, a heater in the oven directly below the water compartment, means delivering steam generated in the water compartment below and around the cooking compartments, and means also delivering steam from the water compartment to the rear and below the oven compartment.

2. In a cooking apparatus, a casing having superimposed compartments therein, the lowermost compartment providing an oven, the next compartment providing a water tank, the remaining compartments providing cooking compartments, means for admitting water into the water compartments, means for draining water therefrom, a heater in the oven directly below the water tank, for generating steam in said water tank, means for delivering steam from the water tank below and around the cooking compartments, a poppet valve permitting the escape of an excess of steam, means directing steam from the water tank to the rear and below the oven, and a valved outlet for said steam delivery means.

3. In a cooking apparatus, a casing having superimposed compartments therein, the lowermost of which providing an oven, the next a water tank, and the remainder cooking compartments, the last mentioned compartments being spaced from each other and from the opposed walls of the casing, except the front wall thereof, the oven and tank being spaced from the walls of the casing except at the front thereof, and the front of the casing having openings communicating with all of the compartments except the water compartment, hinged doors for these compartments, a heater in the top of the oven below the water tank for generating steam in the tank, means for admitting water in the tank, means for draining water therefrom, steam conducting coils between the upper compartments, a steam conducting coil below the oven, a valved outlet therefor, a pipe connecting the last mentioned coil and communicating with the water tank, pipes connecting the first mentioned coils and communicating with the water tank, the uppermost coil having an extension projecting in the space between the top and the uppermost compartment, and a poppet valve arranged directly above said compartments.

4. In a cooking apparatus, a casing having superimposed compartments, the lowermost compartment providing an oven, the next compartment providing a water tank, other compartments providing cooking compartments and a tray disposed above the uppermost cooking compartment, the cooking compartments and the tray being spaced from each other and from all of the walls of the casing, except the front wall, said front wall having openings communicating with the cooking compartments, doors closing the openings, the water tank and oven being spaced from the walls of the casing except the front wall thereof, the said front wall of the casing having an opening communicating with the oven, a door closing said opening, a heater in the oven directly below the tank for generating steam from the water in the tank, a funnel for admitting water into the tank, a cock for drawing water therefrom, coils between the uppermost compartments and tray, pipes connecting the same, one of said pipes leading to and communicating with the water tank, a poppet valve on the top of the casing, a pipe communicating with the water tank and directed below the oven, a coil below the oven connected with the pipe, and a cock controlling the outlet of the coil.

In testimony whereof I affix my signature.

JOHN PENDREIGH STODDART.